United States Patent
Stava

(10) Patent No.: US 7,645,960 B2
(45) Date of Patent: Jan. 12, 2010

(54) CODED WELDING CONSUMABLE

(75) Inventor: Elliott K. Stava, Sagamore Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1200 days.

(21) Appl. No.: 10/872,286

(22) Filed: Jun. 18, 2004

(65) Prior Publication Data

US 2005/0279819 A1  Dec. 22, 2005

(51) Int. Cl.
*B23K 9/095* (2006.01)
*G06F 17/00* (2006.01)

(52) U.S. Cl. .............. 219/130.21; 219/137 R; 235/375

(58) Field of Classification Search ............ 219/130.21, 219/137.71, 137 R, 145.31; 235/375
See application file for complete search history.

(56) References Cited

U.S. PATENT DOCUMENTS

| | | | | |
|---|---|---|---|---|
| 1,940,572 A | * | 12/1933 | Austin | 219/145.31 |
| 3,273,055 A | * | 9/1966 | Quittner | 324/240 |
| 3,497,669 A | * | 2/1970 | Cunningham | 219/137 R |
| 4,929,897 A | * | 5/1990 | Van Der Walt | 324/240 |
| 5,348,208 A | * | 9/1994 | Tamura | 226/24 |
| 6,091,048 A | * | 7/2000 | Lanouette et al. | 219/130.21 |
| 6,426,483 B1 | * | 7/2002 | Blankenship et al. | 219/145.31 |
| 6,510,984 B2 | | 1/2003 | Blankenship et al. | |
| 6,536,660 B2 | | 3/2003 | Blankenship et al. | |
| 6,708,877 B2 | | 3/2004 | Blankenship et al. | |
| 7,032,814 B2 | * | 4/2006 | Blankenship | 235/375 |
| 2004/0004113 A1 | * | 1/2004 | Blankenship | 235/375 |

FOREIGN PATENT DOCUMENTS

JP          10-156698 A  *  1/1998

OTHER PUBLICATIONS

Computer translation of Japan Patent No. 10-156,698 created Apr. 15, 2009.*

* cited by examiner

*Primary Examiner*—Geoffrey S Evans
(74) *Attorney, Agent, or Firm*—Hahn Loeser & Parks LLP

(57) ABSTRACT

A welder for performing a welding process which includes a wire feeder and a code reader. The code reader is designed to obtain information from the welding wire based on a plurality of different cross-sectional sizes and/or different cross-sectional shapes on the outer surface of the welding wire. The information from the code reader is used to monitor at least one welding parameter of an electric arc welding process and/or to control at least one welding parameter of an electric arc welding process.

42 Claims, 4 Drawing Sheets

CODED WELDING CONSUMABLE

The invention relates to the art of welding and, more particularly, to the encoding of metal welding wire with information pertaining thereto, and to the monitoring and/or controlling of automatic or semi-automatic welding apparatuses and processes based on the information extracted from a coded welding wire

INCORPORATION BY REFERENCE

Incorporated herein by reference for background information are U.S. Pat. Nos. 6,510,984; 6,536,660; and 6,708,877; and United States Publication No. 2004/0004113 A1 which are assigned to the assignee of the present application and which disclose the encoding of a welding wire to control an automatic or semi-automatic welding apparatus.

BACKGROUND OF THE INVENTION

This invention relates to the art of welding and, more particularly, to the encoding of metal welding wire with information pertaining thereto, and to the monitoring and/or controlling of automatic or semi-automatic welding apparatuses and processes based on the information extracted from a coded welding wire. The present invention is particularly applicable to the encoding and use of coded welding wire in connection with controlling automatic or semiautomatic arc welding apparatuses and processes based on information pertaining to the welding wire. Accordingly, the invention will be described with reference to such welding wire information in conjunction with manual and/or automatic control of a welding process or apparatus.

Electric arc welding is a complicated process wherein numerous interrelated and non-interrelated parameters affect the deposition of molten metal to a weld pool when performing a welding operation. One such parameter is the welding wire to be used and, in particular, information pertaining thereto which is useful, for example, in determining processes and apparatuses in which its use is best suited and processes and/or apparatus operating parameters for a given wire. In addition, information such as, but not limited to, the alloy type, wire diameter, control numbers, lubrication levels, and the like is valuable for controlling a given process or apparatus so as to optimize performance and weld quality.

One factor affecting weld quality is welding wire feed speed. The welding process takes into account the speed of the electrode in determining the required welding current and/or voltage. The electrode or wire feed speed is normally controlled by a wire feeder apparatus. An integral part of the wire feeder apparatus is a means of measuring the wire feed speed. This signal is applied to a control circuit which compares it to the "wire feed speed" command signal. The output of this control circuit controls the speed of the wire drive motor such that the signal proportional to the wire feed speed is essentially equal to the wire feed speed command. A tachometer is normally employed for measuring the wire speed. This mechanical device includes a wheel or wheels which contact the moving wire. Attached to the wheels is normally a magnet or sets of magnets. As these magnets rotate, they pass by a coil, in which an electrical signal is induced. The frequency of this signal is related to the speed of the wire. Other types of tachometers are also available such as, but not limited to, optical designs which use a beam of light passing through a disk with slits. If the speed of the welding wire is not properly detected, the quality of the formed weld bead is seriously compromised. For instance, if slippage occurs through the drive wheels and/or if dirt, dust, etc. interferes with an optical speed detector, the improper welding wire feed speed will be detected thereby potentially resulting in a low quality weld bead being formed. An unsatisfactory weld bead on a product can result in having to dispose of such products, thus adversely affect the efficiency of the welding process and increasing the costs associated with the lost or unacceptable product. Still another factor affecting weld quality and/or the efficiency of the welding process is the amount of a consumable that remains during a welding process. Consumables such as, but not limited to, the welding wire are consumed during a welding process. During an automatic or semi-automatic welding process, the welding process may not be closely monitored by an operator. As such, the welding wire may be used up during a welding process thereby adversely affecting the weld quality. For instance, when the weld wire is fully consumed, further formation of a weld bead does not occur. In addition, when the welding wire is fully used, the welding operation has to ultimately stop and the consumable must be replaced. The stopping of the welding process reduces welding efficiencies due to unanticipated down time and can also result in partially welded workpieces having to be discarded.

In view of the state of the prior art, there is a need for a welding monitoring and/or control system to improve the efficiencies of automatic and/or semi-automatic welding processes and the quality of a formed weld bead.

SUMMARY OF THE INVENTION

In accordance with the present invention, encoded metal welding wire with information pertaining thereto, and to the monitoring and/or controlling of automatic or semi-automatic welding apparatuses and processes based on the information extracted from a coded welding wire is contemplated by the present invention. The present invention is particularly applicable to the encoding and use of coded welding wire in connection with controlling automatic or semiautomatic arc welding apparatuses and processes based on information pertaining to the welding wire. Accordingly, the invention will be described with reference to such welding wire information in conjunction with manual and/or automatic control of a welding process or apparatus. The welding wire can be any type of consumable welding wire (solid core wire, flux cored wire, etc.).

In accordance with one aspect of the present invention, information pertaining to a welding wire of the foregoing character is encoded thereon. The coding can include visual coding (e.g., colored marking, etc.) and/or physical coding (e.g., indents, ribs, etc.). The information pertaining to the welding wire can be in a number of different categories including, but not limited to, generic or fixed information such as, but not limited to, the product name and/or trademark, the package type, and/or the like; information relevant to the welding wire coiled on a given reel or in a given barrel such as, but not limited to, the alloy chemistry thereof, the weight and/or length of the coiled welding wire, and/or the like. Still another category can be variable information such as, but not limited to, the diameter of the welding wire at locations therealong, the surface condition of the welding wire, winding or twisting conditions, out-of-roundness of the welding wire, the location of anomalies such as, but not limited to, breaks in the welding wire, the globular to spray break over voltage, the remaining length of welding wire on the wire reel, end of and/or near the end of wire indicator, and/or the like.

In accordance with another and/or alternative aspect of the present invention, the encoded information can be extracted prior to use and/or in connection with use of the welding wire in a given welding apparatus. When extracted prior to use, the information enables an operator to manually make the necessary preliminary adjustments of the control system for the welding apparatus to obtain optimum performance thereof, and/or to select between two or more operating modes. With respect to the encoding of information pertaining to the welding wire diameter, for example, the diameter can be encoded at predetermined intervals along the length of the welding wire as it is being manufactured, and the extracting of such information prior to initiating operation of the apparatus enables the operator to adjust parameters of the process or to anticipate times in the process where a parameter such as, but not limited to, the speed of the wire feeding device needs to be adjusted, so as to maintain a desired deposition rate in response to diameter variations along the length of the welding wire. When the encoded information is extracted from the welding wire in connection with the operation of the welding apparatus, the extracted information can be used to automatically configure the control system by adjusting an appropriate parameter or parameters for optimizing the apparatus performance, and/or to automatically switch between different operating modes of the apparatus such as, but not limited to, the spray arc and pulsed arc welding modes and/or other welding modes. Such operating modes are given by way of example only, and many other modes of operation can be selected depending on the particular welding apparatus and/or process with which the principals of the present invention are used. Likewise, the parameters of wire feed speed are given by way of example only, and it will be appreciated that many other parameters can be controlled and/or adjusted using the principals of the present invention such as, but not limited to, arc voltage, arc current, wave shape, arc length or gap, etc.

In accordance with still another and/or alternative aspect of the invention, the encoding on the welding wire is achieved as the welding wire is drawn during the manufacturing process or at a time the welding wire is wound on a reel or inserted into a drum or other type of canister. The encoding typically is achieved by painting the welding wire and/or notching the welding wire; however, other encoding arrangements can be used. The coded information can be read from the wire such as, but not limited to, a camera, a color code or bar code reader, using Hall Effect, inductive pickup coil technology or a magneto-resistive method, after which the code is deciphered. The extracted information can be visually inspected such as, but not limited to, on a video screen, and/or recorded and/or transmitted to the welding apparatus to achieve the foregoing control or switching functions. The coded information can also be read by contact sensors. When reading the wire in conjunction with the operation of welding apparatus, the reading can be accomplished, for example, at the wire feeding device and/or other location on or about the welder.

In accordance with yet another and/or alternative aspect of the invention, the wire feed speed of the welding wire is at least partially determined by the physical properties of the welding wire. This arrangement is designed to monitor the physical properties of a welding wire that travel by a plurality of senors. The rate at which the welding wire passes by the senors is used to determine the welding wire feed speed. In one aspect of this embodiment, a plurality of sets of wire coils are wound on a non-magnetic core are used to determine the welding wire feed speed. The sets of coils are separated by a defined distance and the windings of each set of coils are connected to a bridge circuit. In one non-limiting design, two sets of wire coils are used. Each set of coils has the same number of windings about the non-magnetic core. As can be appreciated, other coil configurations can be used. The bridge circuit is excited with a certain current frequency. In one non-limiting design, the frequency is a low voltage sine wave frequency of about 100-10000 Hz, and typically about 500-2000 Hz; however, it can be appreciated that other voltages and frequencies can be used. The coil separation for each set of wire coils is at least about 0.25 inch, and typically about 0.5-4 inches; however, it can also be appreciated that many different distances of coil separation can be used. The welding wire is fed through the sets of coils. When a uniform cross sectional shaped welding wire passes through the sets of coils, the inductance of the sets of coils is substantially the same and the output of the bridge circuit is substantially zero. However, if the cross-sectional shape of the welding wire is different when passing through the sets of coils, the inductance of one set of coils is different from another set of coils, thus the bridge circuit output will be non zero. The cross sectional shape of the welding wire can be controllable altered in numerous ways. One non-limiting method is to apply a plurality of notches or depressions in the welding wire that are spaced at periodic distances from one another. The notches or depressions in the welding wire can be formed in a variety of ways. One non-limiting method for forming depressions or notches in the welding wire is to feed the welding wire through specially designed wire drive rollers. These drive rollers can be designed to form notches or depressions in the welding wire are the wire passes one or more of the rollers. As can be appreciated, other mechanisms can be used to form notches or depressions in the welding wire. As the welding wire, with small notches or depressions, passes through the sets of coils, the bridge produces a zero output until the welding wire with the small notches or depressions is within the winding of at least one set of coils. At this point, the inductance of this coil is reduced because of a change of the effective cross sectional area of its core caused by the addition of the small notch or depression in the welding wire. The change in inductance of one of the coils causes the output of the bridge circuit to be non zero in one polarity. As the wire with the notch or depression continues to move through the sets of coils, it eventually moves to another set of coils. Again the inductance of this other set of coils is reduced, causing the output of the bridge circuit to again be non zero in the opposite polarity. The speed at which the welding wire is moving is proportional to the time between the two opposite polarity pulses from the bridge circuit divided by the distance between the two sets of coils. As a result, the speed of the welding wire can be accurately determined based on the physical properties of the welding wire. As can be appreciated, any type of cross-sectional variation in the welding wire can be used to obtain wire feed speed information.

In accordance with still yet another and/or alternative aspect of the present invention, the type of welding wire and/or one or more welding parameters can be controlled based on the physical characteristics of the welding wire. This arrangement is designed to monitor the physical properties of a welding wire that travel by a plurality of senors. The information obtained from the welding wire as the welding wire passes by the senors is used to determine the type of welding wire and/or identify and/or control one or more welding parameters during a welding process. The type of information that can be obtained from the welding wire includes, but is not limited to, the type of welding wire (e.g., solid wire, flux coded wire, etc.), the composition of the welding wire (e.g., composition of solid wire, composition of wire sheath, composition of flux core, composition of metal alloy core, etc.), the welding wire diameter, the type of welding process for use with the welding wire (e.g., MIG, TIG, etc.), the type of shielding gas, if any, to be used with the welding wire, welding wire usage (e.g., an end of wire indicator, a beginning of wire indicator, one or more intermediate wire indicators, etc.), welding wire condition information (e.g., surface condition of the welding wire, winding and/or twisting conditions, out-of-roundness of the welding wire, the location of anomalies in welding wire, variations in the diameter of the welding wire and the surface condition thereof, a break or breaks in the welding wire, change in welding wire composition, twist in the welding wire, natural curvature of the welding wire, etc.), manufacturing procedure with respect to a given coil of welding wire, welding wire feed speed settings, voltage settings, current settings, current waveform settings, polarity settings, shielding gas flow settings, welder shut down (e.g., shut down sequence, immediate shut down, etc.), end of welding wire indicator, amount of welding wire remaining, wire manufacturer, and/or the like. In one aspect of this embodiment, one or more coils wound on a non-magnetic core are used to obtain the information from the welding wire. A measured change in the electrical inductance of a coil, due to a change in the area of the magnetic core is used to obtain the information from the welding wire. The welding wire is at least partially used to form the magnetic core. Inductance of a coil with a core of magnetic material is proportional to the area of the core. By measuring the change in inductance caused by the welding wire more through one or more coils, information about the welding wire and/or welding process can be obtained. In one non-limiting design, two coils are separated by a defined distance and the windings of the two coils are connected to a bridge circuit and the other two arms of the bridge can include resistors. The bridge is excited with certain current frequency. The frequency that is passed through the coils is a low voltage sine wave frequency of about 100-10000 Hz, and typically about 500-2000 Hz; however, it can be appreciated that other voltages and frequencies can be used. The coil separation is at least about 0.25 inch, and typically about 0.5-4 inches; however, it can also be appreciated that many different distances of coil separation can be used. The welding wire is fed axially through both coils. When a uniform cross sectional shaped welding wire passes through both coils, the inductance of both coils is substantially the same and the output of the bridge circuit is substantially zero. However, if the cross-sectional shape of the welding wire is different when passing through the two coils, the inductance of one coil is different from the other coil, thus the bridge circuit output will be non zero. The cross sectional shape of the welding wire can be controllable altered in numerous ways. One non-limiting method is to apply a plurality of notches or depressions in the welding wire that are spaced at set distances from one another. The notches or depressions in the welding wire can be formed in a variety of ways. On non-limiting method or forming depression or notches in the welding wire is to feed the welding wire through specially designed wire drive rollers. These drive rollers would form notches or depressions in the welding wire as the welding wire passes one or more of the rollers. As can be appreciated, other mechanisms can be used to form notches or depressions in the welding wire. The information on the welding wire can be place on the welding wire using a defined set of small notches or depressions of various widths and/or distances from one another on the surface of the welding wire. The pattern of these notches can be used to establish a wire identification or code. A small, depth wise, notch or notches are typically use, but not required. The magnitude or depth of the one or more notches or depressions, as well as the width of the one or more notches or depressions will affect the inductance. As the welding wire, with small notches or depressions passes through one of the coils, the bridge produces a zero output until the welding wire with a notch or depression is within the winding of one coil. At this point, the inductance of this coil would be reduced because of a change of the effective cross sectional area of its magnetic core caused by the addition of a small notch or depression in the welding wire. The change in inductance results in the output of the bridge circuit to be non zero in one polarity. As the welding wire, with the notch or depression, continues to move through this coil assembly, it will move with the windings of the second coil. Again the inductance of this second coil will be reduced, causing the output of the bridge circuit to be non zero in the opposite polarity. As the width, depth and/or frequency of the "notches" or depressions vary, the output of the bridge circuit will vary accordingly. The output of the bridge circuit can be applied to a decoder circuit which is used to identify the welding wire and/or welding information on the welding wire and in turn, use such information to adjust the arc welding power source to the appropriate welding program or procedure. In one non-limiting use of the present invention, a welding system is provided that has a plurality of operating conditions including different operating modes. The present invention can be used to control these various operating modes. For instance, a welding system can be designed to operate in several different modes such as, but not limited to, a spray arc mode, a pulsed arc mode, and a spatter mode. Each mode could include a controller that is in turn operable through a system controller to output the corresponding control program to a power supply of the welder. Each of the controllers for the different welding modes could be operable to output a signal to a system controller based on a signal that corresponds to coded information on the welding wire. The system controller could be programed to compare the coded information obtained from the welding wire with mode controller input signals, and when the input signal from one of the mode controllers is the same as the obtained coded information from the welding wire, the system controller connects a particular weld mode controller to the power supply of the welder to operate in accordance with a control program for the corresponding welding mode. As can be appreciated, may other and/or additional control information could be obtained from the welding wire to provide information to and/or to control the operation of a welder. In addition to shifting the welding apparatus between different operating modes, the invention is also applicable to the control of welding process parameters in connection with a given mode of operation of the welding apparatus. Such parameters include, but are not limited to, current waveform (e.g., STT welding, etc.), welding wire feed speed, welding angle, arc current, arc voltage, current polarity, gas flow rate, arc length or gap, etc. Thus, as will be appreciated that information obtained from the welding wire can be directed to a controller used to adjust one or more welding parameters of the welding process. Typically, the information obtained from the welding wire is used by an automatic control or semi-automatic control of a welder apparatus; however, it will be appreciated that the information obtained from the welding wire can be used by an operator of the welder to manually select an appropriate mode of operation and/or to manually adjust one or more operating parameters of the welder.

One object of the present invention is the provision of a method and system for controlling the operation of electric arc welding processes using information on a consumable welding wire.

Another and/or alternative object of the present invention is the provision of a method and system of the foregoing character in which the wire feed speed of the welding wire can be determined using information on the consumable welding wire.

Still another and/or alternative object of the present invention is the provision of a method and system of the foregoing character in which operating parameters of welding apparatus can be set and/or adjusted prior to and/or during the operation a welder in response to extracted information from the welding wire.

Yet another and/or alternative object of the present invention is the provision of welding wire having information in the form of one or more visual markings.

Still yet another and/or alternative object of the present invention is the provision of welding wire having information in the form of one or more notches or depressions.

A further and/or alternative object of the present invention is the provision of a system of encoding information relating to welding wire which enables error detection by a consumer and/or automatic error detection to preclude use of the wrong welding wire in connection with a particular welding process.

Yet a further and/or alternative object of the present invention is the provision of a method of controlling an electric arc welding process based on information encoded on the welding wire.

Still a further and/or alternative object of the present invention is the provision of a system for operating an electric arc welding process by monitoring and/or detecting the end or near the end of the welding wire during a welding process.

Another and/or alternative object of the present invention is the provision of an apparatus and method of welding that improves the quality of weld bead formation during a welding process.

Still another and/or alternative object of the present invention is the provision of an apparatus and method of welding that increase the welding efficiencies during automatic or semi-automatic welding.

These and other objects and advantages will become apparent from the discussion of the distinction between the invention and the prior art and when considering the preferred embodiment as shown in the accompanying drawings.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DETAILED DESCRIPTION OF EMBODIMENTS

Figure 1:
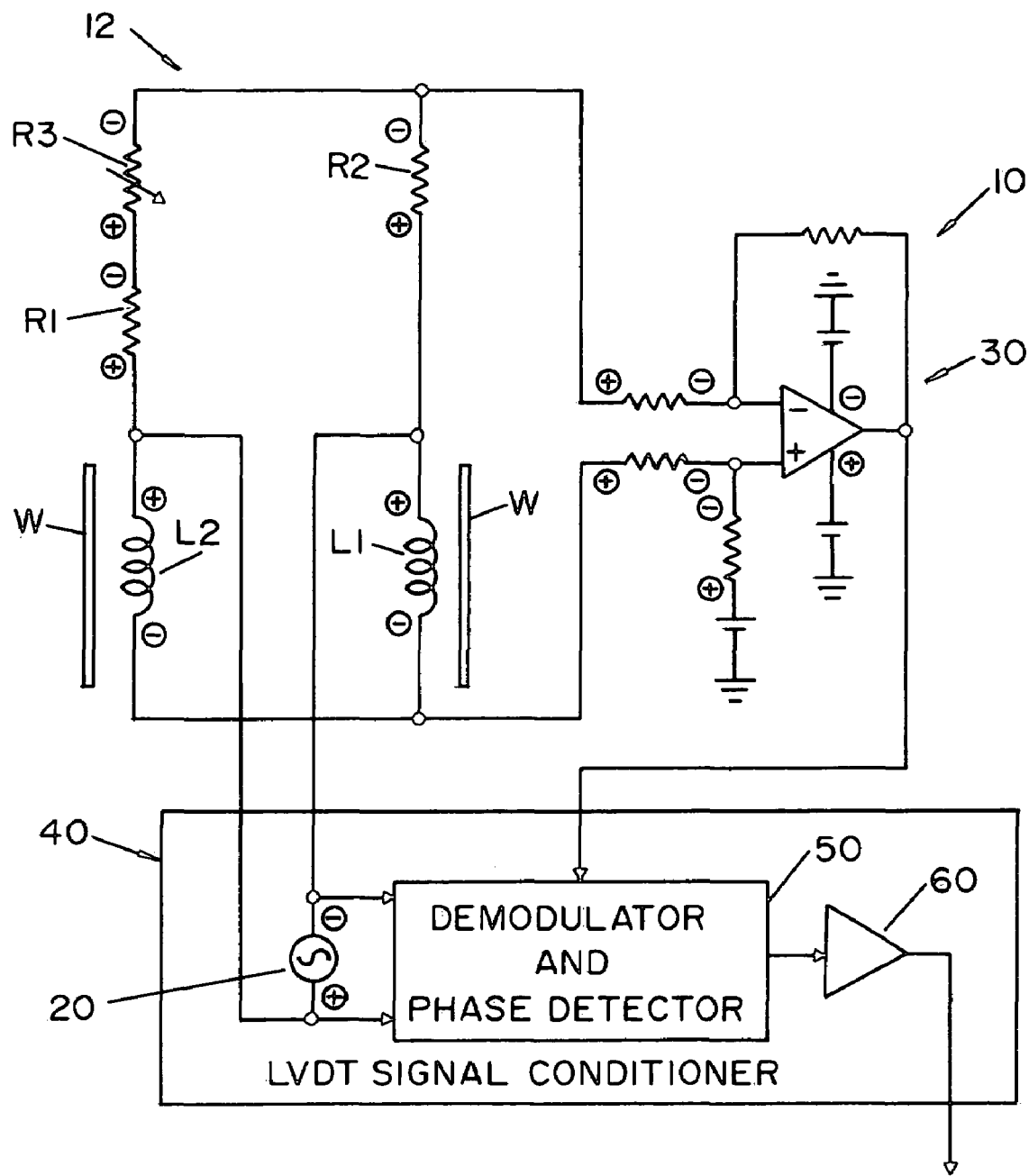
FIG. 1 schematically illustrates an apparatus for detecting the speed of welding wire passing through two wire coils.

Referring now in greater detail to the drawings, wherein the showings are for the purpose of illustrating preferred embodiments of the invention only and not for the purpose of limiting the invention, FIG. 1 illustrates a detection circuit 10 that can be used to detect coded information on a welding wire W as the welding wire is fed to a workpiece. The detection circuit 10 includes a LVDT (linear variable differential transformer) 12. The LVDT includes two induction coils L1 and L2. Each induction coil is wrapped around a bobbin or tube of non-magnetic material, not shown. Welding wire W is directed through each of the non-magnetic tubes. The welding wire forms the movable magnetic core for the LVDT. The LVDT is an electromagnetic device that produces an electrical output proportional to the displacement of a separate, movable magnetic core.

Figure 2:
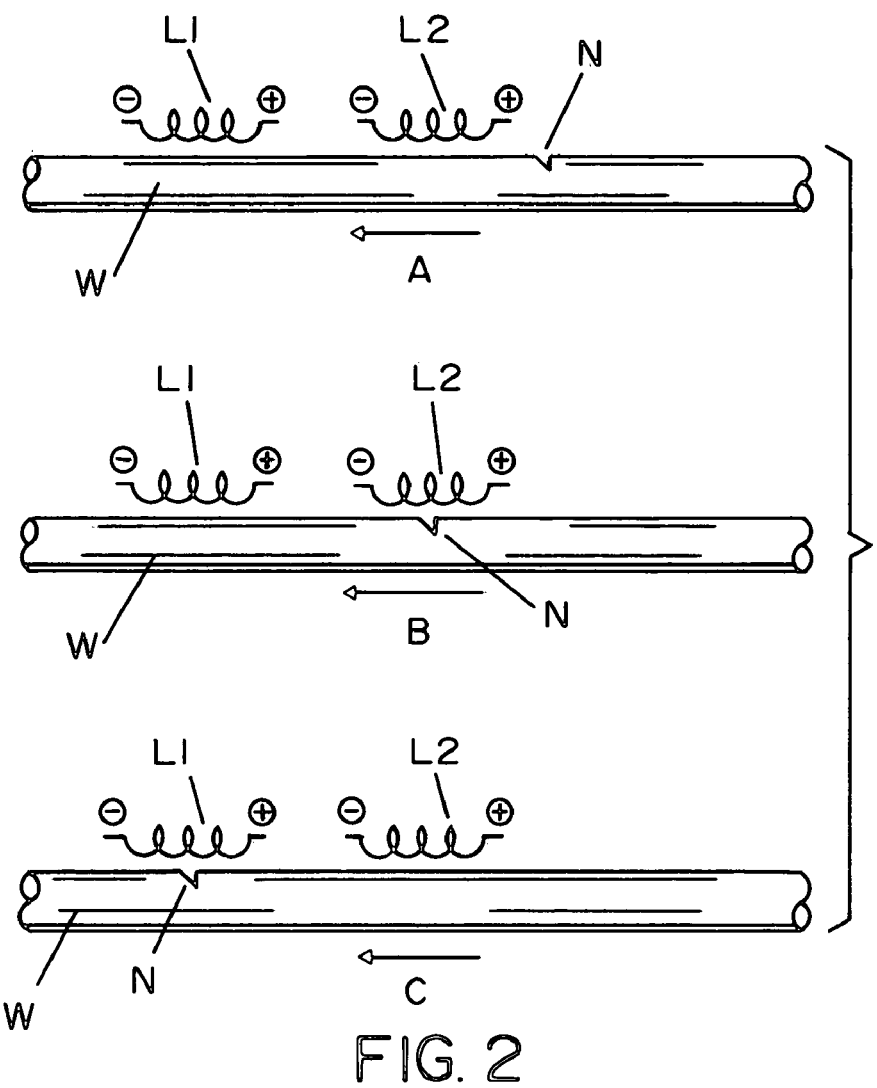
FIG. 2 illustrate the progress of a welding wire as it passes through each of the two wire coils.

As illustrated in FIG. 2, welding wire W includes at least one indentation or notch N in the outer surface of the welding wire. Notch N is typically formed on the welding wire in connection with the manufacture thereof, and is there after wrapped onto a spool or reel or packaged in a drum As the welding wire is drawn during the manufacturing process, the welding wire is passed between impression forming devices (e.g., one or more rollers, etc.) that form the one or more notches N in the outer surface of the welding wire. As can be appreciated, the one or more notches can be formed on the welding wire in a variety of ways. In use, the reel or spool of welding wire is mounted on welding apparatus in association with a wire feeding device by which the wire is payed from the reel or spool and fed to the welding station of the apparatus. Alternatively, welding wire is fed from a drum of welding wire into a wire feeder that directs the welding wire through a welding station.

Figure 3:
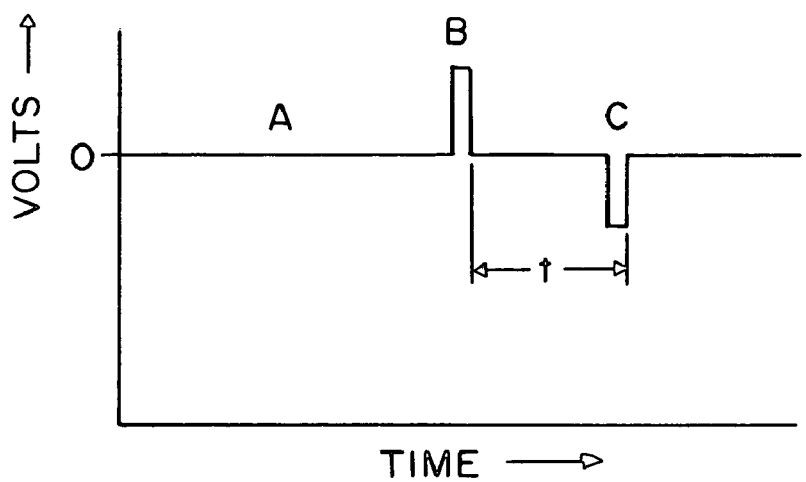
FIG. 3 graphically illustrates the measured inductance as the welding wire passes through the wire coils as shown in FIG. 2.

Referring again to FIG. 1, two coils of wire L1 and L2 typically have an identical number of turns and are wound on a common, non-magnetic tube. The two wire coils are separated by a defined distance. The windings of the two coils are connected to a bridge circuit such that one end of the windings is connected to a bridge amplifier and the other end of the windings is connected to resistors R1, R2 and variable resistor R3. The bridge circuit is also excited with a low voltage sine wave current which is generated by oscillator 20 located in the LVDT signal conditioner 40. Oscillator 20 typically generates a sine wave with an amplitude of a few volts and a frequency between about 1 kHz to 10 kHz; however, it will be appreciated that other parameters of the oscillator can be used. During the operation of the bridge circuit, when a uniform welding wire is passed through both coils L1 and L2, the inductance of both coils are equal and the output of the bridge circuit is zero. Variable resistor R3 can be adjusted to ensure that the output of the bridge circuit is zero when a uniform welding wire is passing through the two coils. When a non-uniform welding wire is passed through the two coils, the inductance of one of the coils is different from the other coil, thereby resulting in the output of the bridge circuit being non-zero. This phenomenon is illustrated in FIGS. 2 and 3.

As shown in FIG. 2, the cross-sectional area of the weld wire in position A is substantially uniform as it is passing through the two coils. When a uniform cross-section of the welding wire exists in both coils, the voltage generated by the bridge circuit is zero as illustrated in FIG. 3. As the welding wire progresses such that notch N is moving within coil L2, as illustrated in position B, the cross-sectional area of the welding wire within coil L2 is less than the cross-sectional area of the welding wire which is within coil L1. This difference in cross-sectional area of the welding wire results in a different inductance being generated by the two coils. This difference in inductance results in the output of the bridge being non-zero as illustrated in FIG. 3. As the welding wire continues to proceed through the coils and moves to position C, the notch in the welding wire exits coils L2 and enters coils L1. Once again, the cross-sectional area of the welding wire is different within the two coils of wire resulting in a non-zero bridge circuit output as illustrated in FIG. 3.

The detection circuit 10 also includes a bridge amplifier 30 which is used to increase the voltage signal generated by the bridge circuit. The bridge amplifier is typically a standard amplifier. The amplified signal from the bridge amplifier is directed into an LVDT signal conditioner 40. The LVDT signal conditioner includes a demodulator and phase detector 50. The demodulator and phase detector converts the AC output signal of the LVDT to a DC signal. This can be accomplished by the use of a diode rectification circuit and/or the use of synchronous demodulation. One simple demodulator and phase detector circuit could include a single diode halfway rectifier and a filter capacitor. In this particular configuration, the resulting two voltages from the induction coils are added together with opposing polarity. When the cross-sectional area of the welding wire W is substantially the same as shown in position A of FIG. 2, the two induction coils generate the same voltage but with opposing polarities. Thus, when these two voltages with opposing polarities are added together, the resulting output is zero, thereby representing the electrical null for the circuit. As the welding wire moves to positions B and C as shown in FIG. 2, the output of the LVDT will go positive in position B and negative in position C. As can be appreciated, other configurations of the demodulator and phase detector can be used. For instance, high gain operational amplifiers with diodes in the feedback loop can be used to form a precision rectifier. As can be appreciated, many other configurations for the demodulator and phase detector can be used. The signal from the demodulator and phase detector is directed to a filter 60 to reduce the noise of the signal.

The non-zero output generated by the bridge circuit of the LVDT can be used to measure the speed of the welding wire as it passes through the two coils. The two coils are separated by a defined distance. As a result, the speed of the welding wire passing through the two induction coils is proportional to the time between the two non-zero signals generated by the bridge circuit as the notch passes through the two coils. A measuring device can be used to detect the amount of time that passes between the occurrence of the two non-zero signals generated by the bridge circuit and use such information to generate a signal that is representative of the speed of the welding wire. The welding wire speed signal can be used to display the current wire feed speed, to adjust the speed of the welding wire so as to maintain the desired welding wire feed speed and/or to control one or more other welding parameters of the welder. As can be appreciated, the wire feed speed detection mechanism can be used as a substitution for or in conjunction with standard tachometers which are normally employed for measuring the wire feed speed on standard welders.

Figure 4:
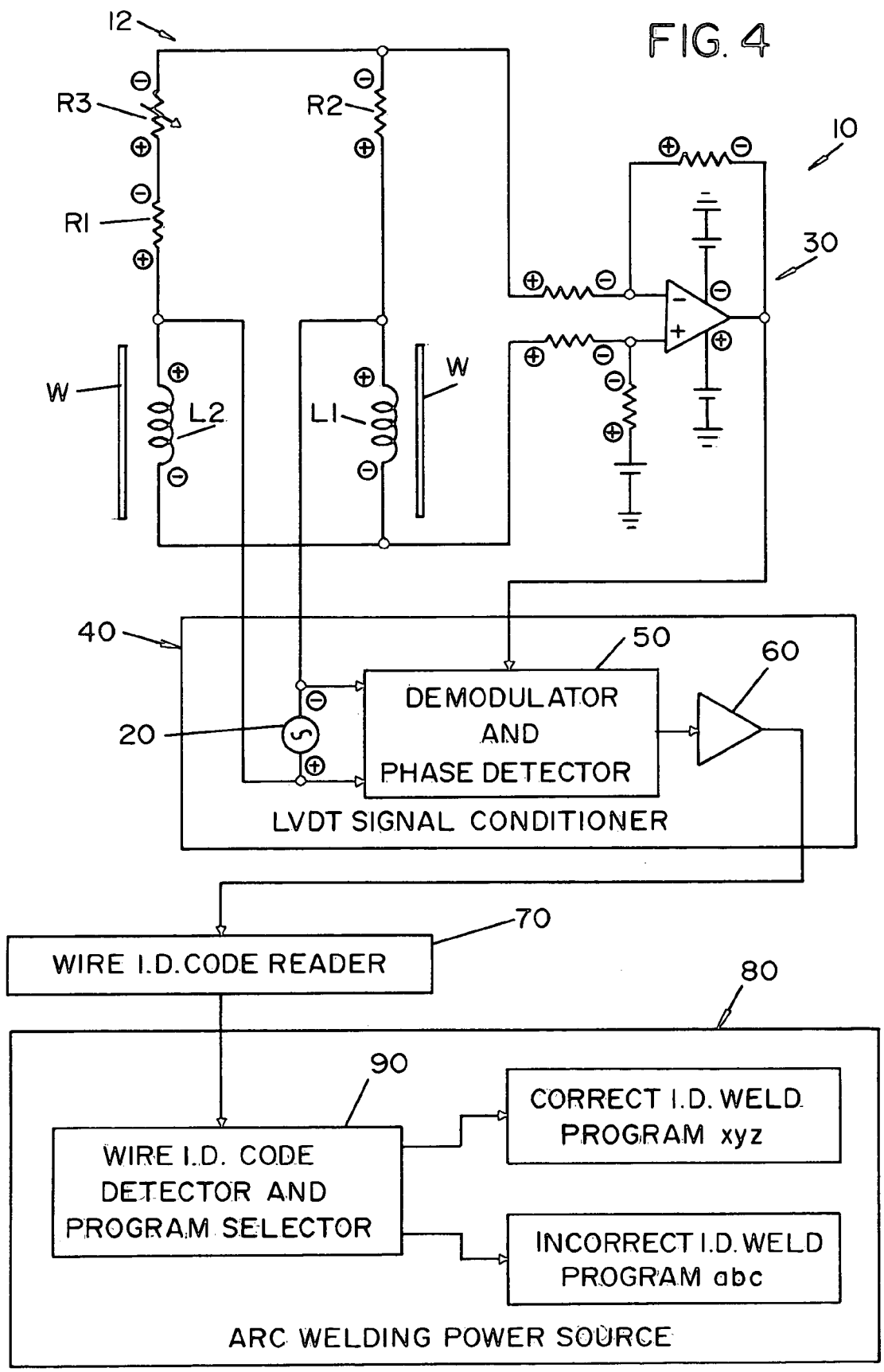
FIG. 4 schematically illustrates an apparatus for detecting encoded information on the welding as the wire passes through two wire coils.
Figure 5:
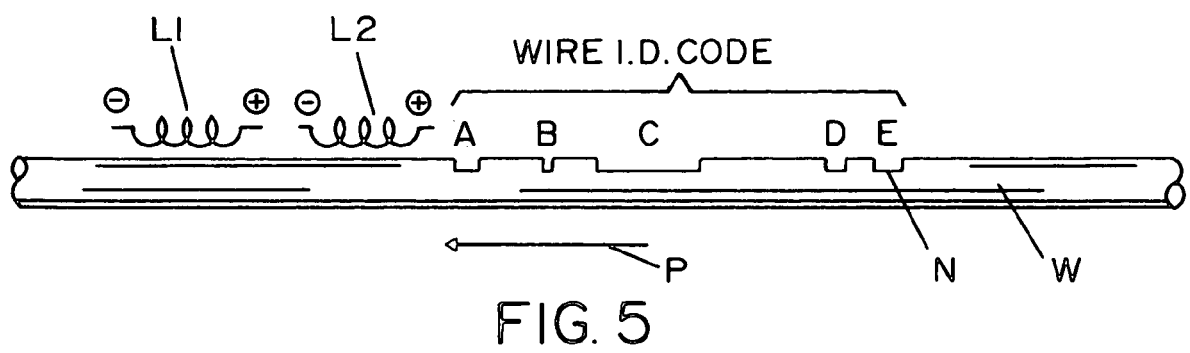
FIG. 5 illustrates a coded welding wire as it passes through two wire coils; and, FIG. 6 graphically illustrates the measured inductance as the welding wire passes through the wire coils as shown in FIG. 5.
Figure 6:
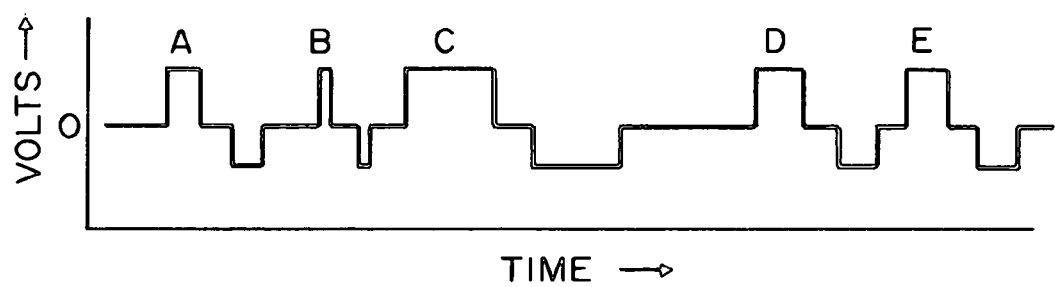

Referring now to FIGS. 4-6, the notches in the welding wire can be used to provide additional information to the welder and/or user. As illustrated in FIG. 5, welding wire W includes a plurality of notches N on the outer surface of the welding wire. Each of these notches is represented as having different lengths and substantially the same depth. As can be appreciated, the depth of the notches can be alternatively or also be varied. As the welding wire W travels along path P through induction coils L1 and L2 as indicated by this arrow in FIG. 5, a non-zero voltage signal is generated by the bridge circuit as the notches pass through each of the coils as illustrated in FIG. 6. The pattern of these voltage signals can be used to provide a variety of information to the welder, such as, but not limited to, the type of wire, a particular welding program to be used for a particular welding operation, etc. As illustrated in FIG. 4, the voltage signal that passes through filter 60 is directed into a wire ID code reader 70. The wire ID code reader 70 is used to compare the voltage signal being generated by the LVDT to a voltage sequence stored in the wire ID code reader. The wire ID code reader then generates a signal based upon the recognized signal pattern and sends the signal to a wire ID code detector and program selector 90 that is used to control an arc welder power source 80. A wire ID code detector and program selector 90 can be used to verify that a preselected welding operation is correct and should proceed, or stop a welding operation if an incorrect ID is determined to exist. Alternatively or additionally, the wire ID code detector and program selector can select a particular program for use in controlling the operation of the arc welding power source. Such program could select the current waveform, the voltage of the electric arc, the type and/or amount of shielding gas to be used, the wire feed speed, etc.

While considerable emphasis has been placed herein on preferred embodiments of the invention, it will be appreciated that other embodiments can be devised and that many changes can be made in the preferred embodiments without departing from the principles of the invention. Accordingly, it is to be distinctly understood that the foregoing descriptive matter is to be interpreted merely as illustrative of the invention and not as a limitation.

Having thus described the invention, it is so claimed:

1. A method of monitoring, controlling or combinations thereof at least one welding parameter of an electric arc welding process including the steps of:
   a) providing an encoded metal welding wire, said welding wire including an outer surface having a plurality of modified cross-sections, a first and second cross-section of the plurality of cross-sections having different cross-sectional sizes, different cross-sectional shapes, or combination thereof;
   b) detecting a change in electrical properties caused by said plurality of different cross-sectional sizes, different cross-sectional shapes, or combination thereof as said welding wire is fed through a welder to form a weld bead;
   c) measuring an amount of time passing between a first and second change in electrical properties caused by said plurality of different cross-sectional sizes, different cross-sectional shapes, or combination thereof; and
   d) using said detected change in electrical properties to monitor at least one welding parameter of an electric arc welding process, to control at least one welding parameter of an electric arc welding process, or combination thereof during said formation of said weld bead.

2. The method as defined in claim 1, wherein said plurality of different cross-sectional sizes, different cross-sectional shapes, or combination thereof are at least partially formed by a plurality of notches, depressions, or combination thereof on said outer surface of said welding wire.

3. The method as defined in claim 2, wherein said step of detecting includes the at least partially passing said welding wire through at least one coil of wire that is at least partially wound about a generally non-magnetic material, said welding wire at least partially forming a magnetic core for said coil of wire.

4. The method as defined in claim 3, including the step of passing a low voltage sine wave through said coil of wire, said coil of wire having an inductance as said welding wire at least partially passes through said coil of wire.

5. The method as defined in claim 4, wherein said detected change in electrical properties includes a change in said inductance of said coil of wire.

6. The method as defined in claim 5, wherein said monitored welding parameter includes welding wire feed speed.

7. The method as defined in claim 5, wherein said monitored welding parameter includes type of welding wire.

8. The method as defined in claim 5, wherein said controlled welding parameter includes type of welding process, wave form selection, arc voltage selection, arc current selection, wire feed speed selection, or combination thereof.

9. The method as defined in claim 2, wherein said step of detecting includes the at least partially passing said welding wire through a first and second coil of wire, each of said coils of wire is spaced from one another and at least partially wound about a generally non-magnetic material, said welding wire at least partially forming a magnetic core for each of said coils of wire.

10. The method as defined in claim 9, including the step of passing a low voltage sine wave through each of said coils of wire, each of said coils of wire having an inductance as said welding wire at least partially passes through said coils of wire.

11. The method as defined in claim 10, wherein said detected change in electrical properties includes a change in said inductance of said coils of wire.

12. The method as defined in claim 11, wherein said monitored welding parameter includes welding wire feed speed.

13. The method as defined in claim 11, wherein said monitored welding parameter includes type of welding wire.

14. The method as defined in claim 11, wherein said controlled welding parameter includes type of welding process, wave form selection, arc voltage selection, arc current selection, wire feed speed selection, or combination thereof.

15. The method as defined in claim 1, wherein said step of detecting includes the at least partially passing said welding wire through at least one coil of wire that is at least partially wound about a generally non-magnetic material, said welding wire at least partially forming a magnetic core for said coil of wire.

16. The method as defined in claim 15, including the step of passing a low voltage sine wave through said coil of wire, said coil of wire having an inductance as said welding wire at least partially passes through said coil of wire.

17. The method as defined in claim 16, wherein said detected change in electrical properties includes a change in said inductance of said coil of wire.

18. The method as defined in claim 17, wherein said monitored welding parameter includes welding wire feed speed.

19. The method as defined in claim 18, wherein said controlled welding parameter includes type of welding process, wave form selection, arc voltage selection, arc current selection, wire feed speed selection, or combination thereof.

20. The method as defined in claim 1, wherein said step of detecting includes the at least partially passing said welding wire through a first and second coil of wire, each of said coils of wire is spaced from one another and at least partially wound about a generally non-magnetic material, said welding wire at least partially forming a magnetic core for each of said coils of wire.

21. The method as defined in claim 20, including the step of passing a low voltage sine wave through each of said coils of wire, each of said coils of wire having an inductance as said welding wire at least partially passes through said coils of wire.

22. The method as defined in claim 21, wherein said detected change in electrical properties includes a change in said inductance of said coils of wire.

23. The method as defined in claim 22, wherein said monitored welding parameter includes welding wire feed speed.

24. The method as defined in claim 1, wherein said monitored welding parameter includes welding wire feed speed.

25. The method as defined in claim 24, wherein said monitored welding parameter includes type of welding wire.

26. The method as defined in claim 25, wherein said controlled welding parameter includes type of welding process, wave form selection, arc voltage selection, arc current selection, wire feed speed selection, or combination thereof.

27. The method as defined in claim 1, wherein said monitored welding parameter includes type of welding wire.

28. The method as defined in claim 27, wherein said controlled welding parameter includes type of welding process, wave form selection, arc voltage selection, arc current selection, wire feed speed selection, or combination thereof.

29. The method as defined in claim 1, wherein said controlled welding parameter includes type of welding process, wave form selection, arc voltage selection, arc current selection, wire feed speed selection, or combination thereof.

30. A welder for performing a welding process, said welder comprising a wire feeder to direct welding wire toward a workpiece from a supply of welding wire in a container and code reader, said welding wire including a plurality of modified cross-sections, a first and second cross-section of the plurality of cross-sections having different cross-sectional sizes, different cross-sectional shapes, or combination thereof, said code reader detecting a change in electrical properties caused by said plurality of different cross-sectional sizes, different cross-sectional shapes, or combination thereof as said welding wire is used in the welding process to form a weld bead, said code reader generating a signal in response to said detected change in electrical properties, said signal used to monitor at least one welding parameter of an electric arc welding process, to control at least one welding parameter of an electric arc welding process, or combination thereof during formation of said weld bead, and said code reader measuring an amount of time passing between a first and second change in electrical properties caused by said plurality of different cross-sectional sizes, different cross-sectional shapes, or combination thereof.

31. The welder as defined in claim 30, wherein said plurality of different cross-sectional sizes, different cross-sectional shapes, or combination thereof are at least partially formed by a plurality of notches, depressions, or combination thereof on said outer surface of said welding wire.

32. The welder as defined in claim 31, wherein said notches, depressions, or combination thereof have substantially the same shape and size.

33. The welder as defined in claim 31, wherein said notches, depressions, or combination thereof are spaced substantially the same distance from one another.

34. The welder as defined in claim 31, wherein a plurality of said notches, depressions, or combination thereof have a different shape, a different size, or combination thereof.

35. The welder as defined in claim 31, wherein a plurality of said notches, depressions, or combination thereof are spaced at different distances from one another.

36. The welder as defined in claim 31, wherein said notches, depressions, or combination thereof are spaced a predefined distance from one another.

37. The welder as defined in claim 36, wherein said code reader at least one coil of wire that is at least partially wound about a generally non-magnetic material, said welding wire designed to at least partially move through said at least one coil of wire to at least partially form a magnetic core for said coil of wire.

38. The welder as defined in claim 37, wherein said code reader includes a signal generator to pass a low voltage sine wave through said coil of wire.

39. The welder as defined in claim 38, wherein said code reader designed to detect a change in inductance of said coil of wire as said welding wire at least partially passes through said coil of wire.

40. The welder as defined in claim 30, wherein said code reader at least one coil of wire that is at least partially wound about a generally non-magnetic material, said welding wire designed to at least partially move through said at least one coil of wire to at least partially form a magnetic core for said coil of wire.

41. The welder as defined in claim 40, wherein said code reader includes a signal generator to pass a low voltage sine wave through said coil of wire.

42. The welder as defined in claim 41, wherein said code reader designed to detect a change in inductance of said coil of wire as said welding wire at least partially passes through said coil of wire.

* * * * *

UNITED STATES PATENT AND TRADEMARK OFFICE
CERTIFICATE OF CORRECTION

PATENT NO. : 7,645,960 B2  Page 1 of 1
APPLICATION NO. : 10/872286
DATED : January 12, 2010
INVENTOR(S) : Elliott K. Stave It is certified that error appears in the above-identified patent and that said Letters Patent is hereby corrected as shown below:

Column 12, line 15 Claim 26 - change "are current" to "arc current".

Column 12, line 25 Claim 29 - change "are current" to "arc current".

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,645,960 B2 | |
| APPLICATION NO. | : 10/872286 | |
| DATED | : January 12, 2010 | |
| INVENTOR(S) | : Elliott K. Stava | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1608 days.

Signed and Sealed this

Sixteenth Day of November, 2010

David J. Kappos
*Director of the United States Patent and Trademark Office*